United States Patent

Cumming et al.

[11] Patent Number: 5,571,626
[45] Date of Patent: Nov. 5, 1996

[54] ELECTROLUMINESCENT DEVICES COMPRISING POLYMERS, AND PROCESSES FOR THEIR USE

[75] Inventors: William J. Cumming, North Chelmsford, Mass.; Russell A. Gaudiana, Merrimack, N.H.; Richard T. Ingwall, Newton, Mass.; Eric S. Kolb, Ipswich, Mass.; Cheryl P. Petersen, Acton, Mass.

[73] Assignee: Polaroid Corporation, Cambridge, Mass.

[21] Appl. No.: 356,884

[22] Filed: Dec. 15, 1994

Related U.S. Application Data

[63] Continuation-in-part of Ser. No. 61,180, May 13, 1993, Pat. No. 5,376,456.

[51] Int. Cl.$^6$ ........................................ B32B 9/00
[52] U.S. Cl. ..................... 428/457; 428/690; 428/917; 313/504; 313/506; 252/301.35
[58] Field of Search ........................... 428/690, 917, 428/457; 313/503, 504, 506; 252/301.35

[56] References Cited

U.S. PATENT DOCUMENTS

| | | | |
|---|---|---|---|
| 3,621,321 | 11/1971 | Williams et al. | 313/108 A |
| 4,356,429 | 10/1982 | Tang | 313/503 |
| 4,446,305 | 5/1984 | Rogers et al. | 528/348 |
| 5,231,329 | 7/1993 | Nishikitani et al. | 313/503 |

FOREIGN PATENT DOCUMENTS

| | | |
|---|---|---|
| WO90/13148 | 11/1990 | WIPO. |
| WO92/03490 | 3/1992 | WIPO. |
| WO92/03491 | 3/1992 | WIPO. |

OTHER PUBLICATIONS

Microelectronics Manufacturing and Testing, 1985 Desk Manual, vol. 8, No. 3, p. 59.
Grant and Hackh's Chemical Dictionary, 1993, 5th Edn., p. 151.
Ohmori et al., Jap. J. Appl. Phys., 30(11B), L1941–1943 (1991).

*Primary Examiner*—Patrick Ryan
*Assistant Examiner*—Marie R. Yamnitzky
*Attorney, Agent, or Firm*—David J. Cole

[57] ABSTRACT

Electroluminescent devices have, as the active layer, a polymer having a chain comprising a plurality of electroluminescent groupings, adjacent pairs of the electroluminescent groupings being connected via two benzene rings linked to each other only by a single covalent bond, at least one of the benzene rings bearing, at a position ortho to the covalent bond, a substituent of sufficient size that the length of the bond connecting the two benzene rings is not less than 1.495 Angstroms. Preferred electroluminescent groupings comprise a chain of three or more para-phenylene groups connected to one another by amide, carboxy, ester, urea, urethane or vinyl groups. The polymers have a fixed conjugation length with predictable electroluminescent properties.

18 Claims, 2 Drawing Sheets

ELECTROLUMINESCENT DEVICES COMPRISING POLYMERS, AND PROCESSES FOR THEIR USE

REFERENCE TO RELATED APPLICATION

This application is a continuation-in-part of application Ser. No. 08/061,180, filed May 13, 1993(now U.S. Pat. No. 5,376,456).

BACKGROUND OF THE INVENTION

This invention relates to electroluminescent devices containing polymers, and to processes for the use of these devices.

In recent years, a great deal of research has been conducted into electro-luminescent materials, that is to say materials which emit electromagnetic radiation (typically visible light) when an electric current flows through the polymer. Electroluminescent materials are potentially useful for the construction of image display devices, which could be very thin and lightweight, and could thus advantageously replace cathode ray tubes, gas plasma displays, liquid crystal displays and other types of image display devices.

Several different types of electroluminescent materials are known; see, generally as to development of such materials, International Patent Application No. PCT/GB90/00584 (Publication No. WO 90/13148). The first type to be developed was inorganic semiconductor materials such as gallium phosphide and zinc sulfide. However, such inorganic electroluminescent materials are not readily usable in large image display devices, and many of them suffer from practical drawbacks, including poor reliability. Accordingly, most recent research has concentrated on organic electroluminescent materials.

Many organic compounds, especially polycyclic arenes such as anthracene, perylene, pyrene and coronene, are electroluminescent. However, electroluminescent devices using these monomeric organic compounds suffer from poor reliability, and these organic compounds present difficulties in preparing the thin layers of the materials needed for use in practical electroluminescent image display devices, and the electrodes needed for electrical contact with such layers. Techniques such as sublimation of the organic material produce layers which are soft, prone to recrystallization and unable to support high temperature deposition of electrode layers, while techniques such as Langmuir-Blodgett film deposition produce films of poor quality, dilution of the active material and high cost of fabrication. Prior art electroluminescent devices formed from these materials, such as that described in U.S. Pat. No. 3,621,321, typically suffer from high power consumption and low light output.

Attempts have also been made to use solid solutions of monomeric organic electroluminescent materials in non-electroluminescent polymers as the active lo layer in electroluminescent devices; see, for example, U.S. Pat. No. 4,356,429. However, use of such solid solutions carries a substantial risk of phase separation by crystallization of the monomer out of the polymer, especially in environments where the electroluminescent device may be subjected to large changes in temperature. In addition, often it is difficult to find a non-electroluminescent polymer which can both conduct electricity and dissolve a large proportion of the active electroluminescent material to form the necessary solid solution. Finally, the use of a solid solution necessarily involves substantial dilution of the active electroluminescent material and thus lowers the maximum light flux from a given area of the electroluminescent device.

Accordingly, research has been carried out on electroluminescent polymers having an electroluminescent group incorporated into the polymer itself, particularly polymers containing a chain of electroluminescent groups (such as para-phenylene vinylene units) conjugated with one another along the chain; see, for example, International Patent Applications PCT/GB90/00584, PCT/GB91/01420 and PCT/GB91/01421 (Publication Nos. WO 90/13148, WO 92/03490 and WO 92/03491 respectively). These polymers do not suffer from the phase separation, solubility and stability problems encountered with the aforementioned solid solutions, and permit some control over the wavelength of the light emitted by variations in the chemistry of the electroluminescent polymer. For example, the aforementioned International Application PCT/GB91/01420 describes electroluminescent polymers comprising at least two different monomer units having different semiconductor bandgaps to control the conjugation length within the polymer, and hence the quantum efficiency and wavelength of light emitted, while the aforementioned International Application PCT/GB91/01421 describes electroluminescent polymers having first and second regions differing in optical properties. However, the copolymers described in these International Applications are random copolymers, in which conjugation extends through a plurality of repeating units of the polymer until interrupted by certain non-conjugated units, which are randomly distributed throughout the polymer chain. In such copolymers, considerable variation in conjugation length is possible because of the varying distances between the non-conjugated units, and because, where a long series of conjugated units occur together in the chain, conjugation may be interrupted by twisting of the chain, and such twisting occurs at essentially random intervals as the chains twist around one another in the polymeric matrix. The variation in conjugation length within these copolymers results in electroluminescent emission over a considerable range of wavelengths.

For certain applications of electroluminescent materials, such as flat panel displays, it is desirable to emit light within a narrow range of wavelengths. In addition, the electroluminescent polymer should not require the presence of additives which pose stability or phase separation problems. Finally, it is desirable that the electroluminescent polymer have good electroluminescent efficiency (which is measured as quanta emitted per electron injected); the electroluminescent efficiencies of prior art polymers are typically of the order of 0.1%, so that large amounts of electrical energy are required to produce an electroluminescent image display device which can be viewed in normal room lighting, as is essential if, for example, the image display device is to be used as a computer monitor or television screen.

It has now been found that electroluminescent polymers having desirable properties can be formed by providing a plurality of electroluminescent groupings in the polymer chain, adjacent pairs of these electroluminescent groupings being connected via a "substituted diphenyl linkage" (as explained in more detail below), this linkage being such that the adjacent electroluminescent groupings are essentially not conjugated with each other.

SUMMARY OF THE INVENTION

This invention provides a process for generating electromagnetic radiation, which process comprises:

providing first and second electrodes;

providing a layer of an electroluminescent polymer disposed between, and in electrical contact with, the first and second electrodes, the electroluminescent polymer having a chain comprising a plurality of electroluminescent groupings, at least one adjacent pair of the electroluminescent groupings being connected via two benzene rings linked to each other only by a single covalent bond, at least one of these benzene rings bearing, at a position ortho to the covalent bond, a substituent of sufficient size that the length of the bond connecting the two benzene rings is not less than 1.495 Angstroms; and applying a potential difference between the first and second electrodes sufficient to cause current to flow from the first electrode to the second electrode and electromagnetic radiation to be emitted from the layer of electroluminescent polymer.

This invention also provides an electroluminescent device comprising a first electrode, a second electrode and a layer of an electroluminescent polymer disposed between, and in electrical contact with, the first and second electrodes, wherein the electroluminescent polymer is a polymer having a chain comprising a plurality of electroluminescent groupings, at least one adjacent pair of the electroluminescent groupings being connected via two benzene rings linked to each other only by a single covalent bond, at least one of the benzene rings bearing, at a position ortho to said covalent bond, a substituent of sufficient size that the length of the bond connecting the two benzene rings is not less than 1.495 Angstroms.

DETAILED DESCRIPTION OF THE INVENTION

As already mentioned, this invention provides an electroluminescent device, and a process for generating electromagnetic (typically visible) radiation using such a device, which use an electroluminescent polymer having a chain comprising a plurality of electroluminescent groupings. At least one adjacent pair of these electroluminescent groupings are connected via two benzene rings linked to each other only by a single covalent bond, at least one of these benzene rings bearing, at a position ortho to the covalent bond, a substituent of sufficient size that the length of the bond connecting said two benzene rings is not less than 1.495 Angstroms (Å).

Such a linkage between two benzene rings, at least one of which is ortho substituted, may be called herein a "substituted diphenyl linkage," with the understanding that the use of the word "diphenyl" does not exclude the possibility that one or both of the benzene rings may be part of a fused polycyclic aromatic system. Thus, the term "substituted diphenyl linkage" includes a bis(2-trifluoromethylnaphthenyl) linkage. However, preferably neither of the benzene rings in the substituted diphenyl linkage forms part of a fused polycyclic system, i.e., each of the benzene rings is a phenyl group rather than being part of a naphthenyl, anthracenyl or other aromatic system.

Figure 1:
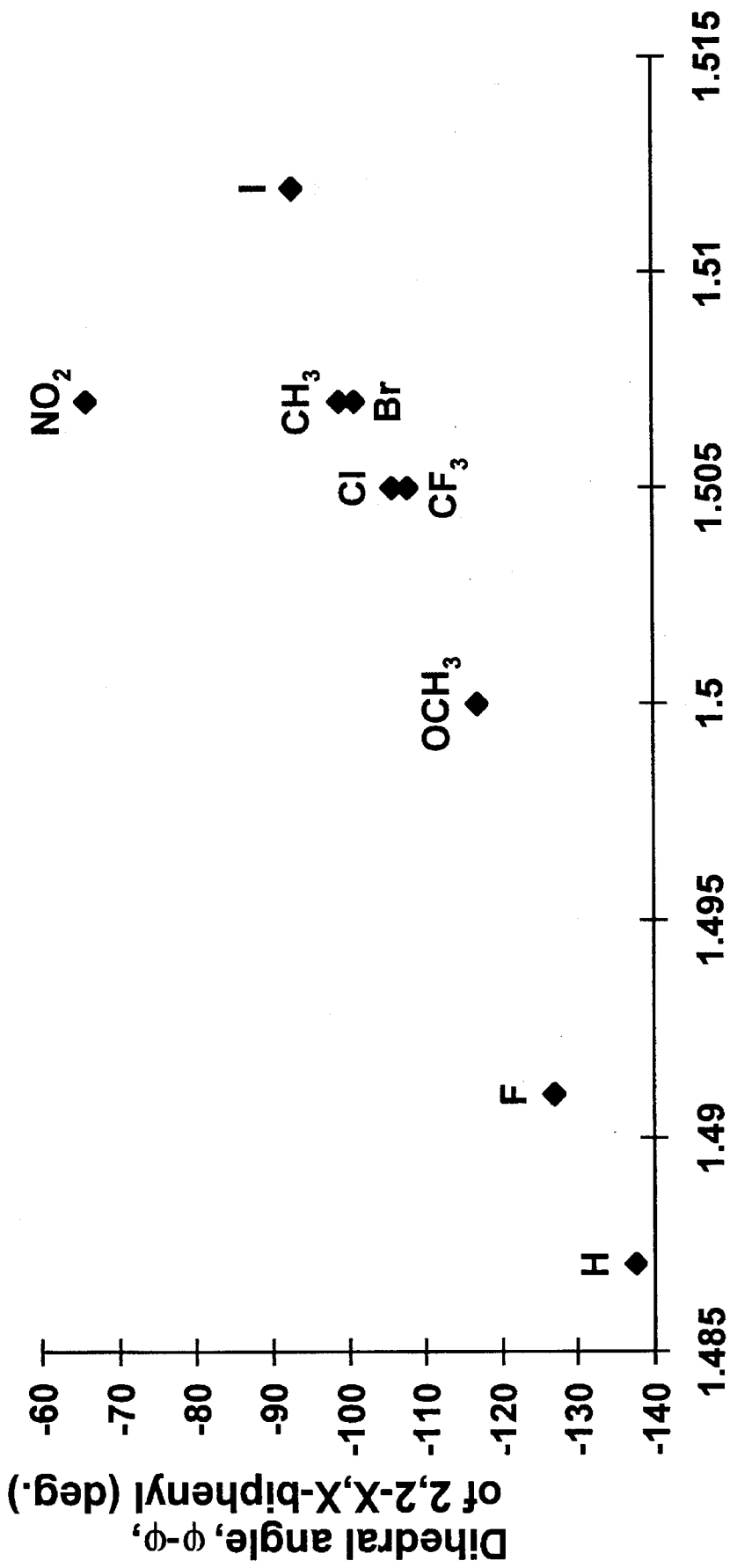
FIG. 1 of the accompanying drawing shows the calculated phenyl-phenyl bond lengths and dihedral angles for various 2,2'-disubstituted biphenyls.

The ortho substituent(s) on the benzene rings serve to interrupt the conjugation between an adjacent pair of electroluminescent grouping which would otherwise occur through benzene rings in a diphenyl group. The ortho substituent(s) increase the length of the bond between the two benzene rings, thus decreasing the bond order of this bond, and also decrease the dihedral angle between the two benzene rings. FIG. 1 of the accompanying drawings shows the calculated phenyl-phenyl bond lengths and dihedral angles for various 2,2'-disubstituted biphenyls; the bond lengths and dihedral angles in polymers containing diphenyl linkages are not expected to vary significantly from those shown in FIG. 1. The values in FIG. 1 are calculated using quenched molecular dynamics with MM2 type molecular mechanics inclusive of additional contributions from both charge-dipole interactions and conjugated $\pi$-systems; $\pi$-orbital self-consistent computation yields bond orders which are used to modify bond lengths and stretching force constants. The interruption of conjugation which occurs at each twisted diphenyl linkage limits the conjugation length within the polymer to the distance between adjacent twisted diphenyl linkages, and thus this conjugation length can be precisely controlled. The precise control of conjugation length thus achieved permits a correspondingly precise control of the electroluminescent properties of the polymer.

The precise chemical nature of the ortho substituent(s) is not critical so long as effective disruption of conjugation between the benzene rings occurs. With certain very bulky substituents, a single ortho substituent may be sufficient to provide the necessary interruption in conjugation. On the other hand, with very small substituents, substitution at both ortho positions on both benzene rings may be desirable to achieve effective interruption in conjugation. In general, it is desirable that each of the benzene rings carry at least one substituent ortho to the covalent bond between the rings. As may be seen from FIG. 1, useful ortho substituents include methyl, methoxy and trifluoromethyl groups (and both steric and other considerations indicate that other alkyl, alkoxy, haloalkyl and haloalkoxy substituents will also be effective), nitro, chloro, bromo and iodo groups. Steric considerations indicate that branched chain alkyl and alkoxy groups, for example, isopropyl and tertiary butyl groups, should be more effective in disrupting conjugation than the corresponding straight-chain alkyl and alkoxy groups. Especially preferred substituents are trihalomethyl groups, especially trifluoromethyl groups.

Besides the benzene rings needed to form the substituted diphenyl linkage, the electroluminescent groupings in the polymer may contain a variety of groups. For example, the electroluminescent groupings may include polycyclic aromatic groups containing carbocyclic or heterocyclic rings, which may be fused or conjugated to one another via covalent linkages or unsaturated chains. For example, each electroluminescent grouping could comprise a 9,10-diphenyleneanthracene grouping, or similar groupings containing naphthacene, pentacene, fluoranthrene, tetrahydrochrysene (or other rigidified stilbene), pyrene, carbazole or perylene groups. However, for ease of synthesis and favorable electroluminescent properties, preferred electroluminescent groupings comprise a chain of at least three para-phenylene groups connected to each other by linking groups, each of these linking groups being an amide, carboxy, ester, urea, urethane or vinyl group. To improve the solubility of such polyphenylene polymers in the solvents typically used to deposit films of electroluminescent polymer to form electroluminescent devices, it is sometimes desirable that at least one of the phenylene groups carry at least one alkoxy group, for example a 2-ethylhexoxy group. Two specific preferred electroluminescent groupings are:

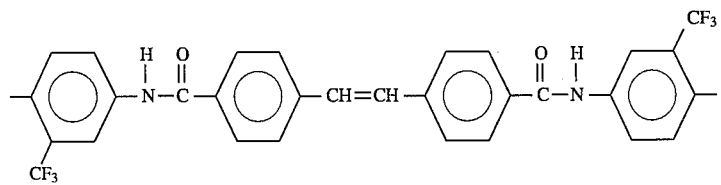

and

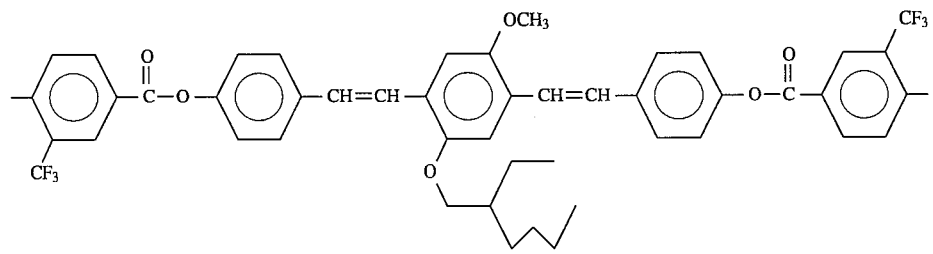

The polymers used in the present invention may contain more than one type of electroluminescent group. Such polymers may be prepared from two or more monomers containing different electroluminescent groups, or precursors thereof able to form electroluminescent groups during the process used to form the polymer. The electroluminescent properties of the polymers may be affected by the stereoregularity, conformation and morphology of the polymer, and thus the polymerization method used to prepare the polymer may need to be chosen having regard to its effect on the polymer stereoregularity, conformation and morphology.

Some of the polymers used in the present invention are known; the first of the two specific preferred polymers of the formulae above, and a process for its synthesis, are described in U.S. Pat. No. 4,446,305, Example 11. Other polymers of the preferred polyphenylene type described above can similarly be prepared by reacting a 4,4'-disubstituted diphenyl, bearing at least one substituent ortho to the bond between the two benzene rings, with a monomer bearing at its opposed ends two groups capable of condensing with the 4- and 4'-substituents on the diphenyl, the monomer being such that when it is condensed with the diphenyl, the monomer residue, together with two phenyl groups, forms an electroluminescent grouping. Preparing a polyphenylene polymer in this manner avoids the difficult synthetic step of forming a covalent bond between two phenyl groups when formation of this bond is hindered by the presence of ortho substituents.

Methods for the formation of other types of electroluminescent polymers useful in the present invention will be apparent to those skilled in the art of polymer synthesis. Whatever preparative method is employed, care should be taken to ensure that a polymer having a sufficiently high molecular weight is produced, since polymers having too low a molecular weight may give unsatisfactory coatings when used in electroluminescent devices.

Incorporation of the polymers of the present invention into electroluminescent devices can be effected by conventional techniques. Essentially, a thin film (typically having a thickness in the range of about 30 to about 500 nm) is placed between a pair of electrodes, at least one of which is transparent so that light emitted from the polymer by electroluminescence can leave the device. This thin film is typically formed by coating one electrode with a solution of the electroluminescent polymer in an appropriate solvent, the thickness of this layer of solution being controlled by spin coating or other techniques known in the art, and the solution is allowed to dry to form the layer of polymer on the electrode. More than one layer of polymer may be used between the electrodes, if desired. Care must be taken that the polymer layer produced is substantially free from defects which may allow short circuits between the electrodes. Following the formation of the layer of polymer on one electrode, the other electrode may be formed on, or secured to, the opposed side of the polymer layer; typically, the second electrode will be formed by direct deposition of metal vapor onto the polymer layer under high vacuum.

As in prior art electroluminescent devices, in the electroluminescent devices of the present invention it is generally advantageous to incorporate, between the polymer layer and the electrodes, additional layers to facilitate injection of holes and/or electrons into the polymer layer. Thus, advantageously, the present electroluminescent devices comprise at least one of a non-metallic hole injecting layer interposed between the first electrode (the anode in operation) and the electroluminescent polymer, and a non-metallic electron-injecting layer interposed between the second electrode (the cathode) and the electroluminescent polymer. The hole-injecting layer and electron-injecting layer used in the present electroluminescent devices can be of the same types as those used in prior art electroluminescent devices. Thus, the hole-injecting electrode should desirably be formed from a material having a high work function compared with the electroluminescent layer, for example indium/tin oxide, platinum, nickel, palladium or graphite. On the other hand, the electron-injecting electrode should desirably be formed from a material having a low work function relative to the electroluminescent layer, for example amorphous or crystalline n-doped silicon, silicon with an oxide coating, or an alkali or alkaline earth metal, either pure or alloyed with another metal, for example silver.

Thus, the present invention provides electroluminescent devices, and processes for their use, which employ polymers in which the conjugation length is known and can be controlled accurately, thus providing predictable electroluminescent properties. Preferred polymers for use in the devices and processes of the invention can be synthesized readily.

The following Examples are now given, though by way of illustration only, to show details of particularly preferred reagents, conditions and techniques used in the electroluminescent devices and processes of the present invention.

EXAMPLE 1

Figure 2:
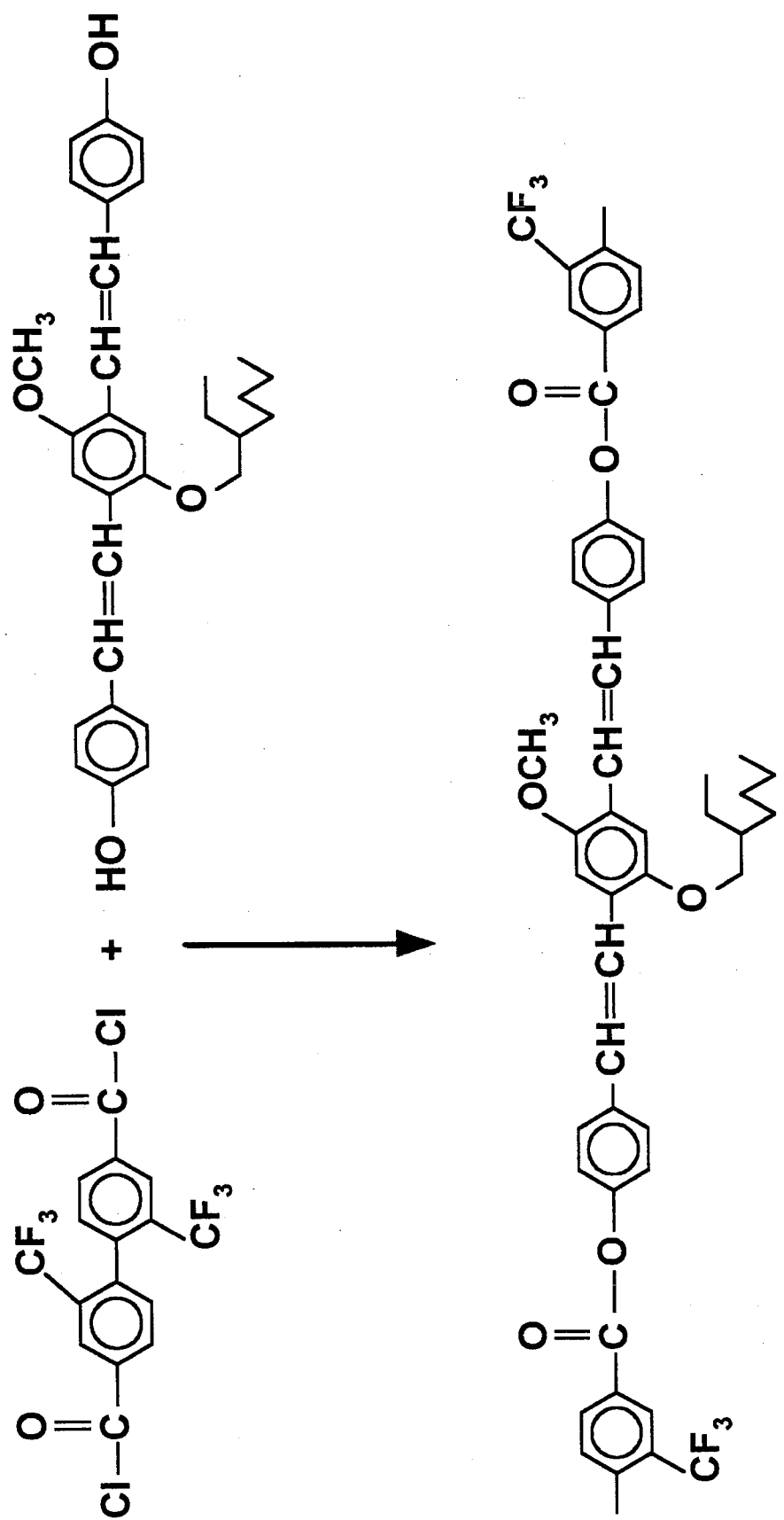
FIG. 2 shows a process for the synthesis of a preferred polymer, as used in Example 1 below.

This Example illustrates the preparation of a polymer by the reaction shown in FIG. 2 of the accompanying drawings.

The bisphenol (0.1139 g, 0.24 mmole), triethylamine (0.167 ml, 1.2 mmole) and dichloromethane (5 mL) were placed in a two-necked flask and the resultant minute was stirred until the bisphenol had dissolved. The diacid chloride (0.100 g, 0.24 mmole) was then added dropwise at a slow rate. The solution almost immediately became thick, and was stirred for about 60 hours. The solution was then washed successively with saturated brine, dilute hydrochloric acid (three times) and again with saturated brine (three times), and poured into rapidly stirred methanol to precipitate the polymer. The precipitate was filtered, dried, redissolved in dichloromethane and precipitated by pouring into rapidly stirred methanol, and again filtered off, then this redissolution and precipitation cycle was repeated. Drying of the final polymer gave a pure, dry product (0.21 g) having $M_w$ 213,000 (by light scattering), $M_n$ 40,000 (by Gel Permeation Chromatography), $M_w/M_n$ 5.25.

To produce an electroluminescent device from this polymer, a 1 weight percent solution of the polymer was prepared in a 10% cyclopentadione/90% tetrahydrofuran (THF) v/v mixture. The electrodes used were of indium tin oxide (ITO) coated glass. The coated glass was washed using a detergent bath in an ultra-sonicator for at least 30 minutes, then thoroughly rinsed with distilled water and dried, either in an oven at 110° C. for 2 hours or in the vapors of refluxing isopropanol for 30 minutes, and stored in a nitrogen-filled glove bag before use. The electrodes were spin coated with xylene at 1500 rpm for 90 seconds, and immediately spin coated on the ITO-coated side with the polymer solution, delivery of the polymer solution being effected dynamically at 2000 rpm for 90 seconds. The electrode was then dried at 50° C. for 15 minutes, and a second electrode was formed on the polymer layer by depositing 200 nm (nominal) of magnesium, followed by 400 nm (nominal) of aluminum, both by metal evaporation.

The photoluminescent properties of the device thus produced were then tested using an apparatus which permitted variation of the voltage applied across the device and recording of the current passing through the device. The light emitted from the device fell on a calibrated photodetector having known sensitivity/wavelength properties. The polymer showed blue photoluminescence ($\lambda_{max}$=498 nm) with a slope efficiency ($\eta$) of $2.75 \times 10^{-5}$ (corresponding to a quantum efficiency of approximately 0.3 percent), a turn-on voltage of 88.0 V, a photodetector current of 883.9 pA, power of about 3.0 nW, and a power density of 0.68 $\mu W/cm^2$.

EXAMPLE 2

The tetraphenylene polymer of the first of the two formulae given above was prepared in the same manner as described in U.S. Pat. No. 4,446,305. Electroluminescent devices were prepared from this polymer in the same way as in Example 1 above, except that the coating solution was prepared by dissolving 0.0148 g of the polymer in 10 ml of tetramethylurea, and the resultant solution centrifuged to remove dust and dirt, and that the spin speeds used for forming the polymer were 1000 rpm (producing a film approximately 80 nm thick) and 1500 rpm (producing a film 60–70 nm thick). The polymer showed blue-white electroluminescence ($\lambda_{max}$=550 nm) with a slope efficiency ($\eta$) of $3.44 \times 10^{-7}$ (corresponding to a quantum efficiency of approximately 0.006 percent), a turn-on voltage of 4.1 V, a photodetector current of 5.05 nA, power of 19 nW, and a power density of 3.8 $\mu W/cm^2$.

We claim:

1. A process for generating electromagnetic radiation, which process comprises:

providing first and second electrodes;

providing a layer of an electroluminescent polymer disposed between, and in electrical contact with, the first and second electrodes, the electroluminescent polymer having a chain comprising a plurality of electroluminescent groupings, at least one adjacent pair of the electroluminescent groupings being connected via two benzene rings linked to each other only by a single covalent bond, at least one of said benzene rings bearing at least one substituent at a position ortho to said covalent bond, the number and size of said ortho substituent(s) being such that the length of the bond connecting said two benzene rings is not less than 1.495 Angstroms; and applying a potential difference between the first and second electrodes sufficient to cause current to flow from the first electrode to the second electrode and electromagnetic radiation to be emitted from the layer of electroluminescent polymer.

2. A process according to claim 1 wherein neither of said benzene rings forms part of a fused polycyclic aromatic system.

3. A process according to claim 1 wherein each of said benzene rings carries at least one substituent ortho to said covalent bond.

4. A process according to claim 1 wherein the ortho substituent is selected from the group consisting of alkyl, alkoxy, haloalkyl, haloalkoxy, nitro, chloro, bromo and iodo groups.

5. A process according to claim 4 wherein each of said benzene rings carries a substituent ortho to said covalent bond, each of said substituents being selected from the group consisting of alkyl, alkoxy, haloalkyl, haloalkoxy, nitro, chloro, bromo and iodo groups.

6. A process according to claim 1 wherein at least one of said electroluminescent groupings comprises a chain of at least three para-phenylene groups connected to each other by linking groups, each of said linking groups being an amide, carboxy, ester, urea, urethane or vinyl group.

7. A process according to claim 6 wherein at least one of the phenylene groups carries at least one alkoxy group.

8. A process according to claim 1 further comprising:

providing a non-metallic hole injecting layer interposed between the first electrode and the electroluminescent polymer.

9. A process according to claim 1 further comprising:

providing a non-metallic electron-injecting layer interposed between the second electrode and the electroluminescent polymer.

10. An electroluminescent device comprising a first electrode, a second electrode and a layer of an electroluminescent polymer disposed between, and in electrical contact with, the first and second electrodes, wherein the electroluminescent polymer is a polymer having a chain comprising a plurality of electroluminescent groupings, at least one adjacent pair of the electroluminescent groupings being connected via two benzene rings linked to each other only by a single covalent bond, at least one of said benzene rings bearing at least one substituent at a position ortho to said covalent bond, the number and size of said ortho substituent(s) being such that the length of the bond connecting said two benzene rings is not less than 1.495 Angstroms.

11. An electroluminescent device according to claim 10 wherein, in the electroluminescent polymer, neither of said benzene rings forms part of a fused polycyclic aromatic system.

12. An electroluminescent device according to claim 10 wherein, in the electroluminescent polymer, each of said benzene rings carries at least one substituent ortho to said covalent bond.

13. An electroluminescent device according to claim 10 wherein, in the electroluminescent polymer, the ortho substituent is selected from the group consisting of alkyl, alkoxy, haloalkyl, haloalkoxy, nitro, chloro, bromo and iodo groups.

14. An electroluminescent device according to claim 13 wherein, in the electroluminescent polymer, each of said benzene rings carries a substituent ortho to said covalent bond, each of said substituents being selected from the group consisting of alkyl, alkoxy, haloalkyl, haloalkoxy, nitro, chloro, bromo and iodo groups.

15. An electroluminescent device according to claim 10 wherein, in the electroluminescent polymer, at least one of said electroluminescent groupings comprises a chain of at least three para-phenylene groups connected to each other by linking groups, each of said linking groups being an amide, carboxy, ester, urea, urethane or vinyl group.

16. An electroluminescent device according to claim 15 wherein, in the electroluminescent polymer, at least one of the phenylene groups carries at least one alkoxy group.

17. An electroluminescent device according to claim 10 further comprising potential applying means for applying to the first electrode a higher potential than that of the second electrode, and a non-metallic hole injecting layer interposed between the first electrode and the electroluminescent polymer.

18. An electroluminescent device according to claim 10 further comprising potential applying means for applying to the first electrode a higher potential than that of the second electrode, and a non-metallic electron-injecting layer interposed between the second electrode and the electroluminescent polymer

* * * * *